Patented Mar. 21, 1950

2,501,509

UNITED STATES PATENT OFFICE 2,501,509

PREPARATION OF AMINES

William F. Gresham, Richard E. Brooks, and Walter M. Bruner, Wilmington, Del., assignors to E. I. du Pont de Nemours & Company, Wilmington, Del., a corporation of Delaware No Drawing. Application May 5, 1945, Serial No. 592,270

17 Claims. (Cl. 260—583)

This invention relates to organic nitrogen compounds and to methods for their preparation. More particularly, this invention has reference to improvements in the preparation of organic amines by reaction between ammonia, primary amines, or secondary amines and organic compounds containing olefinic unsaturation.

It has been known for many years that amines can be prepared by reaction between olefinic compounds containing activating substituents and certain ammonia-type compounds, in the presence of alkali metal catalysts under autogenous pressure (French Patent 662,431). The process, however, had several disadvantages. Even the highly active olefinic materials, such as the dienes, generally required a reaction time of several days, and the ordinary olefinic compounds either completely failed to react, or did so so slowly that substantial amounts of the desired N-alkylated amines could not be obtained. Because of these defects, the process has never had any practical utility, and has not, in fact, even been considered as meeting the requirements of a suitable method for preparing amines on a laboratory scale. However, it has been apparent that the starting materials which are consumed in such a process are readily available and very inexpensive. Accordingly, it was evident that the process would in all probability be technically valuable if it could be freed of aforesaid defects.

An object of this invention is to provide improvements in the catalytic reaction of ammonia-type compounds (i. e., ammonia, primary amines, and secondary amines) with organic compounds containing olefinic unsaturation so as to bring the process within the range of practical utility; in particular, this involves speeding up of the reaction so that the process can be completed in a matter of minutes or hours, rather than days, as required heretofore. A further object is to obtain excellent yields of amines from diolefines and ammonia-type compounds in a reaction time of from a few minutes to about 1 hour. A still further object is to provide improvements whereby ordinary olefines, in the absence of activating substituents, may be caused to react with ammonia-type compounds to give high yields of organic amines. A still further object is to provide new compositions of matter obtainable through the use of such process improvements. Other objects will appear hereinafter.

These objects are accomplished in accordance with the invention by reacting an ammonia-type compound with a compound containing olefinic unsaturation, under the influence of an alkali metal catalyst, in the presence of an organic liquid diluent for the olefinic reactant at a temperature within the range of 50° to 350° C. The diluent may be (1) an excess of the ammonia-type compound, (2) an inert solvent, (3) a relatively inert amine (i. e., an amine which is less reactive than the reactant ammonia-type compound) or (4) any combination of such diluents.

While the reaction between ammonia-type compounds and olefines can, in many instances, be conducted under the herein defined conditions of temperature and pressure in the absence of such a diluent, the reaction rate and yield are improved in an unexpected degree by having the olefinic reactant in relatively dilute form at the temperatures and pressures required for rapid reaction. Thus, the reaction time, which according to the prior art was about 4 days, has been decreased according to the invention to as low as about 2 to 35 minutes by the use of the aforesaid diluent at elevated temperatures.

The reaction pressures required in the practice of the invention are determined primarily by the nature of the olefinic compound. For example, the conjugated dienes, according to the invention, react readily at a pressure of from 1 to 3 atmospheres; ethylene generally requires a pressure of at least 100 atmospheres; propylene and isobutylene react less readily, and usually require pressures of at least about 200 to 400 atmospheres. The maximum pressure is limited solely by the strength of the retaining vessel, and may be as high as 1500, or 3000 atmospheres, if desired.

The invention may be practiced, as illustrated in a specific embodiment, by heating the ammonia-type compound and a monoolefine and/or diolefine in the presence of the aforesaid diluent, in a closed vessel containing about 0.1% to 20%, preferably about 1% to 10% of the alkali metal catalyst, based on the weight of reaction mixture. The weight of diluent should preferably be from 0.5 to 10 times the weight of the olefinic reactant. The mixture is heated (a suitable temperature for the conjugated dienes is about 60° to 100° C., for the monoolefines about 150° to 325° C.) at the appropriate reaction pressure, as set forth above, for a few minutes, then cooled to room temperature. Distillation of the resulting mixture gives the desired amines in conversions frequently exceeding 80%.

The invention is illustrated further by means of the following examples.

*Example 1.*—A mixture containing 115.6 grams of hexamethylene diamine and 27 grams of butadiene (mol ratio of amine: olefine=2:1) and 3.4 grams of metallic sodium was heated at a temperature of 70° to 84° C. for 30 minutes under pressure. The pressure initially was about 3 atmospheres, but as the reaction progressed it decreased to about 1 atmosphere. Distillation of the resulting product gave N-butenyl hexamethylenediamines in the following percentage conversions: N-monobutenyl hexamethylene diamine (B. P., 122.7° C./9 mm., $N_d^{25}$=1.4654, $D_{20}$=0.81, neutralization equivalent 85.13, 85.15 (calc. 85.16)), 21.4%; N,N-dibutenyl hexamethylenediamine (B. P. 122 to 125° C./4 mm.)

$$N_d^{25}=1.4711$$

neutralization equivalent 112.1 (calc. 112.2), 29.4%; N,N,N'-tributenyl hexamethylenediamine (B. P., 133° to 145° C. at 2.5 mm., neutralization equivalent 137 (calc., 139), 26.1%; N-tetrabutenyl hexamethylenediamine, B. P. ca. 170°/2 mm.), 3.4% (total conversion, 80.3%).

*Example 2.*—A mixture containing 116.4 grams of hexamethylenediamine, 14 grams of butadiene (mol ratio of amine:olefine=ca.4:1) and 3.6 grams of metallic sodium was heated under autogenous pressure (1 to 3 atmospheres) in a pressure-resistant vessel at 71° to 77° C. for 35 minutes. Conversions to mono-, di-, and tri-butenyl hexamethylenediamines were 27.8%, 55.2%, and 6.9% respectively (total conversion, 89.9%).

*Example 3.*—A mixture containing 75 grams of benzene, 42 grams of propylene, 51 grams of ammonia and 2.3 grams of sodium metal was heated for 4 hours at 950 to 1070 atmospheres pressure at a temperature of 267° to 278° C. Distillation of resulting product gave isopropylamine (22.8% conversion), and a small amount of di-isopropylamine (formed from the isopropylamine and propylene).

*Example 4.*—A mixture containing 60 grams of benzene, 45 grams of isobutylene, 1.8 grams of sodium and 41 grams of ammonia was heated for one hour at a temperature of 250° to 265° C. under pressure of 650 to 700 atmospheres. Distillation of the resulting product gave tertiary-butylamine (8% conversion).

*Example 5.*—A mixture containing 23.2 grams of hexamethylene diamine, 10.0 grams of metallic sodium, 30 grams of ethylamine, 40 grams of benzene and 60 grams of ethylene was heated for 202 minutes at a temperature of 225° to 245° C. under a pressure of 400 to 650 atmospheres. Distillation of the resulting product gave 30 grams of ethylamine and 25.3 grams of N-monoethyl hexamethylenediamine. Repetition of this experiment under similar conditions without the ethylamine gave 15.7 grams of N-monoethyl hexamethylene diamine (B. P., 65 to 68°/3 mm.).

The above examples are illustrative only and should not be considered in a limitative sense. The reaction time is frequently limited only by the rate of heat transfer in heating up and cooling the reactants. Organic liquid diluents for the olefinic reactant are operative as a general class, it being understood, of course, that such substances have the effect of diluting the olefinic reactant without destroying the amine. Suitable inert solvents may be employed such as aliphatic ethers, benzenes, cyclohexane and the like.

When the diluent contains an amino compound which is derivable by amination of the olefine reactant, the effect on alkylation of a relatively reactive diamine generally is to increase preferentially the proportion of mono-substitution product (as in Example 5). A probable explanation for this phenomenon is that there is a competitive formation of linear polymeric amines from N-alkyl diamines which involves the splitting out of ammonia or alkyl amines, which reaction is suppressed, by way of a mass action effect, by having such an alkyl amine present in the reaction mixture. The olefinic reactant in these reaction mixtures, as in reaction mixtures above-described which do not contain such an alkyl amine, should preferably be present to the extent of about 5 to 40% by weight of the total reaction mixture.

This invention is applicable in the preparation of amines from olefinic compounds and ammonia, alkyl amines, aliphatic diamines, heterocyclic amines, aromatic amines, cycloaliphatic amines, or other such amines having at least one hydrogen atom attached to an amino nitrogen. The olefinic compounds are hydrocarbons, but it is to be understood that various substituted hydrocarbons which do not contain interfering substituents may be employed in an equivalent manner. Optimum results are generally obtainable when the molal ratio of the amine to olefinic compound is initially within the range of 2:1 to 5:1.

Since many different embodiments of the invention may be made without departing from the spirit and scope thereof, it will be understood that we do not limit ourselves except as set forth in the following claims.

We claim:

1. A process for the preparation of amines which comprises heating an ammonia-type compound of the class consisting of ammonia, primary amines, and secondary amines with a hydrocarbon olefinic compound under the influence of an alkali metal catalyst in the presence of from 0.5 to 10 parts of an organic liquid diluent for the olefinic reactant, per part of the olefinic reactant, at a temperature within the range of 50° to 350° C. under a reaction pressure within the range of from 1 to 1500 atmospheres.

2. The process set forth in claim 1 in which the said diluent is an excess of organic ammonia-type compound, above the amount theoretically required to react with the olefine.

3. The process set forth in claim 1 in which the said diluent contains as an essential ingredient an amine which is less reactive than the ammonia-type compound undergoing reaction.

4. The process set forth in claim 1 in which the said ammonia-type compound is ammonia.

5. The process set forth in claim 1 in which the said ammonia-type compound is hexamethylenediamine.

6. The process set forth in claim 1 in which the said ammonia-type compound is an alkyl amine having at least one hydrogen atom attached to amino nitrogen.

7. The process set forth in claim 1 in which the said olefinic compound is butadiene, and the said ammonia-type compound is hexamethylenediamine.

8. The process set forth in claim 1 in which the said olefinic compound is a monoolefine hydrocarbon.

9. The process set forth in claim 1 in which the said olefinic compound is ethylene.

10. A process for the preparation of amines which comprises heating an ammonia-type compound of the class consisting of ammonia, primary amines, and secondary amines with an olefine hydrocarbon in the presence of a sodium metal catalyst and from 0.5 to 10 parts of an organic liquid diluent for the olefinic reactant, per part of the olefinic reactant, said diluent containing initially a primary alkyl amine derivable by amination of the olefine reactant, at a temperature within the range of 50° to 350° C. under a reaction pressure within the range of 1 to 1500 atmospheres, and separating from the resulting mixture the amine produced by the ensuing reaction.

11. A process for the synthesis of amines which comprises reacting hexamethylenediamine with a hydrocarbon olefinic compound having from 2 to 4 carbon atoms per molecule, at a temperature within the range of 50° to 350° C. under a reaction pressure within the range of 1 to 1500 atmospheres, in the presence of an alkali metal catalyst and an organic liquid diluent, the quantity of the said diluent being initially from 0.5 to 10 parts by weight per part of the said olefinic compound, and thereafter separating from the resulting reaction mixture the amines produced by the said reaction.

12. A process for the synthesis of N-butenylhexamethylenediamines which comprises heating a reaction mixture containing from about 2 to 4 mols of hexamethylenediamine per mol of butadiene, and about 1 to 10% by weight of metallic sodium, based on the weight of the reaction mixture, at a temperature of about 60° to 100° C. in a pressure-resistant vessel, for about 30 to 35 minutes, whereby N-butenylhexamethylenediamines are obtained in conversions exceeding 80% of the theoretical conversion.

13. A process for the synthesis of amines which comprises reacting, at a temperature of about 225° to 245° C., under a pressure of about 400 to 600 atmospheres, hexamethylenediamine and ethylene, in the presence of sodium metal catalyst and an organic liquid diluent which is inert towards the said hexamethylenediamine, said diluent containing ethylamine as an essential ingredient, said diluent being present initially in the reaction mixture to the extent of 0.5 to 10 parts by weight per part of ethylene, whereby N-monoethylhexamethylenediamine is preferentially produced and thereafter separating the said N-monoethylhexamethylenediamine from the resulting reaction mixture.

14. A compound of the class consisting of N-monobutenylhexamethylenediamine, N,N-dibutenylhexamethylenediamine, and N,N,N'-tributenylhexamethylenediamine.

15. N-monobutenylhexamethylenediamine.

16. N,N-dibutenylhexamethylenediamine.

17. N,N,N'-tributenylhexamethylenediamine.

WILLIAM F. GRESHAM.
RICHARD E. BROOKS.
WALTER M. BRUNER.

REFERENCES CITED

The following references are of record in the file of this patent:

UNITED STATES PATENTS

| Number | Name | Date |
| --- | --- | --- |
| 2,172,822 | Tamele | Sept. 12, 1939 |
| 2,362,464 | Britton | Nov. 14, 1944 |
| 2,381,470 | Teeter | Aug. 7, 1945 |
| 2,381,471 | Teeter | Aug. 7, 1945 |
| 2,381,472 | Teeter | Aug. 7, 1945 |
| 2,381,709 | Apgar et al. | Aug. 7, 1945 |
| 2,417,892 | Teeter | Mar. 25, 1947 |
| 2,417,893 | Teeter | Mar. 25, 1947 |
| 2,429,855 | Teeter | Oct. 28, 1947 |

FOREIGN PATENTS

| Number | Country | Date |
| --- | --- | --- |
| 313,934 | Great Britain | Jan. 14, 1929 |
| 528,466 | Germany | July 1, 1931 |
| 662,431 | France | Aug. 7, 1929 |